United States Patent Office 3,335,108
Patented Aug. 8, 1967

---

3,335,108
STABILIZATION OF POLYOLEFINS WITH
N,N-DISUBSTITUTED GLYCINE
Robert M. Pines, Spring Valley, N.Y., assignor to Geigy Chemical Corporation, Greenburgh, N.Y., a corporation of Delaware
No Drawing. Filed July 9, 1962, Ser. No. 208,599
5 Claims. (Cl. 260—45.8)

This invention relates to the stabilization of polyolefin material, e.g. polypropylene, polyethylene, etc. against deterioration due to oxidation, heat, and/or light. The invention also relates to compositions of said polyolefins stabilized thereby. The invention further relates to novel synergistic combinations of stabilizers for said polyolefins.

Surprisingly it has now been found that polyolefins, in particular polypropylene and high and low density polyethylene are stabilized with the addition of small quantities of stabilizers of the Formula I

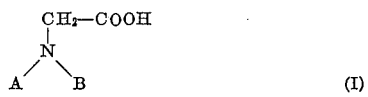

wherein

A and B are each independently either hydroxy-lower-alkyl or carboxy-lower-alkyl, and the alkali metal, e.g. sodium, potassium or ammonium salts of I.

Examples of compounds of the Formula I are: N,N-di(2-hydroxyethyl)-glycine, N,N - di(carboxymethyl)-glycine, N-(2-hydroxyethyl)-N-carboxymethyl-glycine.

While the stabilizers of the Formula I are contemplated for use in polyolefins, it is desirable to use the same not alone, but rather in combination with other thermal and/or oxidative deterioration inhibiting stabilizers. When a stabilizer of the Formula I is used in conjunction with such stabilizers there is sometimes observed a synergistic effect in protecting the polyolefin resin against deterioration due to heat and oxidation. Thus, the stabilizers of the Formula I often remarkably increase the life of the resin as well.

The stabilizers of the Formula I are used generally in an amount of from about 0.01% by weight to about 5% by weight based upon the stabilized composition. Those auxiliary stabilizers which are also present in the resin which is stabilized besides those of the Formula I may be found in amounts from about 0.05% to about 5% by weight in preferred embodiments of the invention.

It has now been found that the stabilizers of Formula I are especially valuable for use in stabilizing polyolefin compositions, e.g. polypropylene or polyethylene, when such stabilizers of the Formula I are used in combination with other additives, such as thermal and oxidative stabilizers having phenolic groups therein. For example the auxiliary stabilizers of the invention are represented by compounds of the Formula II:

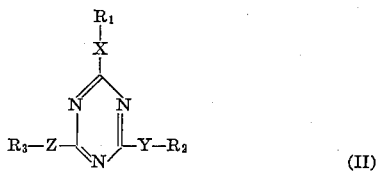

wherein $R_1$ and $R_2$ each independently respresent an alkyl group of from 1 to 18 carbon atoms, e.g. methyl, ethyl, propyl, butyl, pentyl, octyl, dodecyl, octadecyl, etc., a cycloalkyl group having 5 or 6 carbon atoms, e.g. cyclopentyl or cyclohexyl, a phenyl group, an alkylphenyl group of from 7 to 24 carbon atoms, e.g. methylphenyl, ethylphenyl, butylphenyl, octylphenyl, octadecylphenyl, dimethylphenyl, dibutylphenyl, dioctadecylphenyl, etc., carbalkoxyalkyl of 3 to 15 carbon atoms, e.g. carbomethoxymethyl, carbethoxyethyl, carbobutoxyethyl, carbo-n-lauryloxyethyl, etc. or carbalkoxyphenyl of 8 to 19 carbon atoms, e.g. carbomethoxyphenyl, carbethoxyphenyl, carbo-n-octyloxyphenyl, carbo-n-lauryloxyphenyl, etc., alkylthioalkyl, $R_2$ is defined the same as $R_1$ and also the same as $R_3$, $R_3$ represents alkylhydroxyphenyl of 7 to 24 carbon atoms, e.g. methylhydroxyphenyl, ethylhydroxyphenyl, butylhydroxyphenyl, octylhydroxyphenyl, octadecylhydroxyphenyl, di-t-butylhydroxyphenyl, methyl-di-t-butylhydroxyphenyl, etc., X, Y and Z are each independently O, S, imino, substituted imino, e.g. benzyl, alkanoyl, lower alkyl, etc.

Examples of compounds according to the Formula II which are usefully employed in combination with compounds of the Formula I are:

6-(4-hydroxy-3,5-di-t-butylanilino)-2,4-bis-(n-octylthio)-1,3,5-triazine,
6-(4-hydroxy-3,5-di-t-butylanilino)-2,4-bis-phenylthio-1,3,5-triazine,
6-(4-hydroxy-3,5-di-t-butylanilino)-2,4-bis-(octadecylthio)-1,3,5-triazine,
2-n-octylthio-4,6-bis-(4-hydroxy-3,5-di-t-butylphenoxy)-1,3,5-triazine,
6-(4-hydroxy-3,5-di-t-butylphenoxy)-2,4-bis-(n-octylthio)-1,3,5-triazine,
6-(4-hydroxy-3,5-di-t-butylphenoxy)-2,4-bis-(n-octylthioethylthio)-1,3,5-triazine,
6-(4-hydroxy-3,5-di-t-butylanilino)-2,4-bis-cyclohexylthio-1,3,5-triazine,
6-(2-hydroxy-3,5-di-t-butyl-6-methylanilino)-2,4-bis-(n-octylthio)-1,3,5-triazine,
6-(4-hydroxy-3,5-di-t-butylanilino)-2,4-bis-(2,3-dimethylphenylthio)-1,3,5-triazine,
6-(4-hydroxy-3,5-di-t-butylanilino)-2,4-bis-(carbo-n-lauryloxyethylthio)-1,3,5-triazine,
6-(4-hydroxy-3,5-di-t-butylanilino)-2,4-bis-(4-t-octylphenoxy)-1,3,5-triazine,
6-(4-hydroxy-3,5-di-t-butylanilino)-2,4-bis-(2-carbo-n-lauryloxyphenylthio)-1,3,5-triazine,
6-(4-hydroxy-3,5-di-t-butyl-N-benzylanilino)-2,4-bis-(n-octylthio)-1,3,5-triazine.

Other phenolic stabilizers usefully employed in combination with the stabilizers of the Formula I are those of the Formula III:

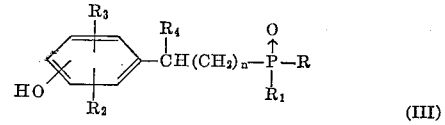

wherein

R is hydroxyl; alkylphenoxy, preferably having from 7 to 24 carbon atoms; phenyl; phenoxyl; alkylthio or alkoxy, preferably alkylthio or alkoxy having from 12 to 24 carbon atoms, examples of useful alkoxy groups represented by R being methoxy, ethoxy, isopropoxy, propoxy, butoxy, secondary butoxy, tertiary butoxy, pentoxy, hexoxy, heptoxy, octyloxy, nonyloxy, decyloxy, undecyloxy, dodecyloxy, tridecyloxy, tetradecyloxy, pentadecyloxy, hexadecyloxy, heptadecyloxy, octadecyloxy, nonadecyloxy, heneicosoxy, docosoxy, tricosoxy, tetracosoxy, etc.; in the foregoing examples for R it is understood that oxygen may be usefully substituted by sulfur so that methylthio, ethylthio, isopropylthio, propylthio, butylthio, sec. butylthio, t-butylthio, pentylthio, hexylthio, heptylthio, octylthio, nonylthio, decylthio, undecylthio, dodecylthio, tridecylthio, tetradecylthio, pentadecylthio, hexadecylthio, heptadecylthio, octadecylthio, etc. are also contemplated; examples of useful alkylphenoxy groups represented by R being methylphenoxy, ethylphenoxy, isopropylphenoxy, propylphenoxy, butylphenoxy, dibutylphenoxy, tributylphenoxy, pentylphenoxy, hexylphenoxy, heptylphenoxy, octylphenoxy, nonylphenoxy, decylphenoxy, undecylphenoxy, dodecylphenoxy, tridecylphenoxy, tetradecylphenoxy, pentadecylphenoxy, hexadecylphenoxy, heptadecylphenoxy, octadecylphenoxy, dinonylphenoxy, etc.; alkylthioalkyloxy; alkylthioalkylthio;

$R_1$ is defined the same as R above, except that $R_1$ is *not* phenyl, *nor* hydroxyl;

$R_2$ and $R_3$ each independently represents alkyl, e.g. alkyl having from 1 to 18 carbon atoms, preferably having from 1 to 5 carbon atoms, especially tertiary butyl; examples of useful alkyl groups being methyl, ethyl, propyl, isopropyl, butyl, secondary butyl, tertiary butyl, pentyl, hexyl, heptyl, octyl, nonyl, decyl, undecyl, dodecyl, tridecyl, tetradecyl, pentadecyl, hexadecyl, heptadecyl, octadecyl, etc.;

$R_4$ represents hydrogen or lower alkyl, e.g. methyl, ethyl, propyl, isopropyl, butyl, secondary butyl, tertiary butyl, pentyl, hexyl, but especially methyl; and $n$ represents 0, 1, 2 or 3, preferably 0 or 1.

In general, it has been found that the stabilizers of the Formula I are valuable in enhancing the stabilization effect of a wide variety of stabilizers for polyolefinic material. This enhancement is surprisingly greater than would be predicted from the stabilization realized by each stabilizer taken alone. Thus, often where a stabilizer having a phenolic residue, especially a phenolic residue substituted in at least one of the positions ortho to the phenolic OH group is used in conjunction with a stabilizer of the Formula I, a remarkably synergistic stabilizer system is obtained. The foregoing Formulae II and III are illustrative of two classes of stabilizers having a phenolic residue therein. The scope of the invention, however, extends beyond these two classes to include any phenolic residue containing stabilizer suitable for the stabilization of polyolefinic material, especially polypropylene. The invention also extends to the use of other stabilizers such as the mercapto acids of the Formula V hereinbelow.

Compounds of the Formula II are prepared according to methods described in copending application Ser. No. 87,520, filed Feb. 21, 1961, by M. Dexter et al., now abandoned.

Compounds of the Formula III are prepared according to methods described in copending application Ser. No. 102,958, filed Apr. 14, 1961, by J. D. Spivack, now abandoned.

Examples of further phenolic stabilizers are those of the Formula IV:

$$\left[ HO \underset{R_2}{\overset{R_1}{\underset{\|}{\bigcirc}}} (A)_m - \overset{O}{\underset{\|}{C}} - O \right]_n B - R_3 \quad (IV)$$

wherein $R_1$ represents alkyl—especially lower alkyl, i.e. having from 1 to 6 carbon atoms, preferably a tertiary butyl group—or hydrogen;

$R_2$ represents an alkyl group, especially lower alkyl, i.e. having from 1 to 6 carbon atoms, preferably a tertiary butyl group;

A represents an alkylene group (straight or branched chain), preferably lower alkylene having from 1 to 6 carbon atoms, e.g.

—CH$_2$—, —CH$_2$—CH$_2$—, —CH—CH$_2$—, —CH$_2$—CH—CH$_2$—
          |           |
          CH$_3$      CH$_3$

—CH$_2$—CH$_2$—CH$_2$—, —CH$_2$—CH$_2$—CH$_2$—CH$_2$—, —(CH$_2$)$_5$—

—(CH$_2$)$_6$—, —CH$_2$—CH—CH$_2$—CH$_2$—, etc.; especially preferred are
       |
       CH$_3$ —CH$_2$—, —CH—, —(CH$_2$)$_2$— and —(CH$_2$)$_3$—
   |
   CH$_3$ B represents an alkylene group (straight or branched chain), as defined for A above, except that when $R_3$ is hydrogen in Formula I, then B may contain up to 24 carbon atoms, especially from 6 to 18 carbon atoms;

$n$ represents 1 or 2;

$m$ represents 0 or 1; and $R_3$ represents—
 (a) when $n$ is 1:
  (i) hydrogen, or
  (ii) alkylthio—especially having from 1 to 24 carbon atoms (preferably having from 8 to 18 carbon atoms), or
  (iii) hydroxyalkylthio—especially hydroxyethylthio; and
 (b) when $n$ is 2:
  (i) alkylenethio, preferably alkylenethio having from 1 to 6 carbon atoms, especially alkylenethio having 2 carbon atoms, or
  (ii) alkylene—especially as defined for A above, or
  (iii) alkyleneoxy—especially alkyleneoxy having 2 carbon atoms.

Preparation of the compounds of the Formula IV is disclosed in copending application, Ser. No. 164,618, filed Jan. 5, 1962, by Martin Dexter et al., now abandoned.

Other stabilizers may also be usefully employed in conjunction with the stabilizers of the Formula I, such as for example stabilizers of the Formula V $$\begin{array}{c} CH_2-CH_2-CO-O-R_1 \\ | \\ S \\ | \\ CH_2-CH_2-CO-O-R_2 \end{array} \quad (V)$$

wherein $R_1$ and $R_2$ are each independently an alkyl group of from 1 to 24 carbon atoms, such as for example the compound methyl, ethyl, propyl, butyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl.

It is an object of the invention to provide stabilized compositions of polypropylene which are normally solid at room temperature. It is another object of the invention to provide a method of stabilizing normally solid polypropylene by incorporating therein a minor portion, preferably from about 0.01% to about 10% (based on the total composition) of a stabilizing system which comprises a stabilizer of the Formula I in an amount of from about 0.01% to about 5% by weight and, in a preferred embodiment, at least one other stabilizer as described above. Other additives and stabilizers may also be present without adversely affecting the aforesaid stabilizing system.

Solid polymers of polyolefins, e.g. polypropylene, find extensive use in various forms of plastic ware. Many different articles of manufacture are produced from polypropylene plastic materials which can be molded and shaped at higher temperatures while remaining relatively rigid at ordinary room temperature. Polyethylene thermoplastic molding or coating agents have high dielectric strength and excellent resistance to water, but unfortunately they are prone to attack by atmospheric oxidation and/or exposure to light, e.g. UV light. Moreover, during processing, such thermoplastic materials are subject to polymeric degradation due to thermal instability. Deterioration caused by one or more of the foregoing may lead to loss, e.g. of dielectric properties, and/or to discoloration, embrittlement or other physical break-down.

The present invention presents a solution to the problem of how to check these deteriorating agencies and enhance the appearance of the solid polypropylene and polyethylene theremoplastic materials so that they may be processed and used in the final product with superior ageing characteristics at both room and elevated temperatures, better color, better processing stability and improved resistance to ultraviolet degradation—in short, so that the polypropylene and polyethylene resins employing the stabilizer system of this invention have superior stability characteristics.

While the present stabilizer system employs a compound of Formula I as a basic component, surprisingly in many cases, said system goes far beyond the expected stabilizing power of said compound of Formula I alone. Compositions comprising polypropylene and said compound of Formula I alone, for example, possess far less stability to thermal oxidation than polypropylene resins stabilized with a system according to the present invention comprising a compound of the Formula I and at least one other stabilizer, e.g. II, III, IV or V. Moreover, the superior results obtained cannot be explained as a mere additive effect. When the system of the invention is employed as a stablizing system for polypropylene, a surprisingly high increase in ageing life and processing stability at elevated temperatures, is obtained. It is entirely unexpected that the improvement in stability characteristics of the polypropylene is significantly greater than the improvement realized when each of the individual components of the stabilizer system is employed alone under the same conditions. The improvement from the combined stabilizer system is far greater than the sum of the individual improvements due to the single stabilizer components when employed alone in the polypropylene; thus, a true synergism is produced.

Any olefinic polymer, but especially polypropylene and polyethylene, which is normally solid at ordinary room temperature may be stabilized with the system according to the invention.

Thus, besides homopolymeric material, the method of the invention is useful for stabilizing copolymers, including block and graft polymers and physical mixtures thereof.

The stabilizer system of the invention may be incorporated into polypropylene during milling, extruding, or any other suitable process. Moreover, said stabilizer system may be advantageously preformed before incorporation into the solid polymer. Alternatively, the individual components of the stabilizer system may be incorporated into the polypropylene separately or in combination with one or several other components. Concentrations of from about 0.01% to about 10% by weight of the total stabilizer system, based upon the total stabilized composition, are advantageously employed according to the invention.

The following examples of stabilization of polyolefinic material, e.g. polypropylene and polyethylene, are meant for illustration purposes and are not intended to limit the scope of the invention in any way. In said examples parts are by weight unless otherwise specified and the relationship of parts by weight to parts by volume is as that of grams to cubic centimeters. Temperatures are expressed in degrees centigrade.

In addition to the foregoing auxiliary stabilizers, it is understood that other additives, or coloring agents may be present in the polymeric material to be stabilized. For example, there may be present pigments, dyes, light stabilizers, lubricants, plasticizing agents, anti-slip agents, thermal stabilizers, antioxidants.

Further, the auxiliary stabilizers used in combination with the compounds of the Formula I, may be any suitable stabilizer having the group

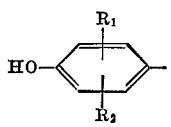

wherein $R_1$ may be hydrogen or alkyl, especially alkyl from 1 to 12 carbon atoms, $R_2$ may be alkyl, especially alkyl having from 1 to 12 carbon atoms; examples of alkyl for $R_1$ and $R_2$ being methyl, ethyl, propyl, butyl, pentyl, hexyl, heptyl, octyl, nonyl, decyl, undecyl, dodecyl, wherein normal or branched chain alkyl groups are contemplated.

Specific auxiliary stabilizers having the group

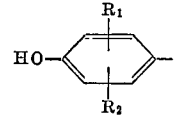

are:

Butylated hydroxyanisole
2,2'-thiobis(4-methyl-6-t-butylphenol)
2,2'-methylenebis(4-methyl-6-t-butylphenol)
4,4'-butylidenebis(6-tert·butylmetacresol)
4,4'-thiobis(6-tert·butyl-metacresol)

EXAMPLES: STABILIZATION OF POLYPROPYLENE

Example 1

Unstabilized polypropylene powder (Hercules PROFAX 6501) is thoroughly blended with 0.1% by weight of N,N-bis(carboxymethyl)-glycine and 0.1% by weight of 6-(4 - hydroxy-3,5-di-t-butylanilino)-2,4-bis-(n-octylthio)-1,3,5-triazine. The blended material thereafter is milled on a two roller mill at 182° for six minutes, after which time the stabilized polypropylene is sheeted from the mill and allowed to cool.

The milled polypropylene sheet, thus stabilized, is then cut into small pieces and pressed for seven minutes on a hydraulic press at 218° and 174 pounds per square inch pressure. The resultant sheet of 25 mil thickness is then tested for resistance to accelerated aging in a forced draft over at 149°. The stabilized polypropylene is not subject to deterioration after 40 hours in the oven while the unstabilized material deteriorates after about 3 hours; polypropylene is stabilized with N,N-bis(carboxymethyl)-glycine alone for less than 7 hours; with 0.1% of 6-(4-hydroxy - 3,5 - di - t - butylanilino)-2,4-bis-(n-octylthio) 1,3,5-triazine alone polypropylene fails after 110 hours.

At elevated temperatures, for example about 300°, the so stabilized polypropylene exhibits very good processing stability and very little polymer degradation as compared to the unstabilized polypropylene.

If in the foregoing Example 1, the concentrations of the individual stabilizer components each are varied within the stabilizer system so that concentrations of 0.05%, 0.1%, 0.3%, 0.5%, and 1% by weight, respectively, are employed, then in a similar fashion good results are obtained.

If in the foregoing Example 1, in place of 0.1% of 6-(4-hydroxy - 3,5-di - t-butylanilino) - 2,4-bis-(n - octylthio)-1,3,5-triazine, a similar amount of one of the following is substituted:

6-(4-hydroxy-3,5-di-t-butylanilino)-2,4-bis-phenylthio-1,3,5-triazine,
6-(4-hydroxy-3,5,-di-t-butylanilino)-2,4-bis-(octadecylthio)-1,3,5-triazine,
6-(4-hydroxy-3,5,di-t-butylanilino)-2,4-bis-cyclohexylthio-1,3,5-triazine,
6-(2-hydroxy-3,5-di-t-butyl-6-methylanilino)-2,4-bis-(n-octylthio)-1,3,5-triazine,
6-(4-hydroxy-3,5-di-t-butylanilino)-2,4-bis-(2,3-dimethylphenylthio)-1,3,5-triazine,
6-(4-hydroxy-3,5-di-t-butylanilino)-2,4-bis-(carbo-n-lauryloxyethylthio)-1,3,5-triazine,
6-(4-hydroxy-3,5-di-t-butylanilino)-2,4-bis-(4-t-octylphenoxy)-1,3,5-triazine, 6-(4-hydroxy-3,5-di-t-butylanilino)-2,4-bis-(2-carbo-n-lauryloxyphenylthio)-1,3,5-triazine,
6-(4-hydroxy-3,5-di-t-butyl-N-benzylanilino)-2,4-bis-(n-octylthio)-1,3,5-triazine,
4,6-bis-(4-hydroxy-3,5-di-t-butylphenoxy)-2-(n-octylthio)-1,3,5-triazine,
then similar results are obtained.

Example 2

In the same manner as in Example 1 polypropylene is stabilized with a stabilizer system comprising 0.1% of N,N-bis(carboxymethyl)-glycine and 0.1% of di-n-octadecyl-3,5-di-t-butyl-4-hydroxybenzylphosphonate (weight percent).

The so-stabilized polypropylene is tested in the same manner as in Example 1 and is stabilized against deterioration for 60 hours. The unstabilized polypropylene deteriorates after only 3 hours, while when 0.1% by weight alone of di-n-octadecyl-3,5-di-t-butyl-4-hydroxybenzylphosphonate is used, the stabilization is not effective after 30 hours. Similarly, if 0.1% by weight of N,N-bis(carboxymethyl)-glycine alone is used, then the same fails in 7 hours.

In a similar way, if instead of 0.1% by weight of di-n-octadecyl-3,5-di-t-butyl-4-hydroxybenzylphosphonate one of the following stabilizers is employed in the same amount:

Di-n-octadecyl-(3-t-butyl-4-hydroxy-5-methylbenzyl)-phosphonate,
Di-n-octadecyl-(3',5'-di-t-butyl-4'-hydroxyphenyl)-ethane-phosphonate,
Di-n-octadecyl-3,5-di-t-butyl-2-hydroxybenzylphosphonate,
Di-n-dodecyl-2-(3',5'-di-t-butyl-4'-hydroxyphenyl)-ethane phosphonate,
Diethyl-3,5-di-t-butyl-4-hydroxybenzylphosphonate,
Dimethyl-3,5-di-t-butyl-4-hydroxybenzylphosphonate,
Di-p-t-octylphenyl-3,5-di-t-butyl-4-hydroxybenzylphosphonate,
O-n-butyl-3,5-di-t-butyl-4-hydroxybenzylphosphonic acid,
Di-n-dodecyl-3,5-di-t-butyl-4-hydrovybenzylphosphonate,
Di-n-dodecyl-3,5-di-t-butyl-4-hydroxylbenzylphosphonate,
O-n-decyl-O-phenyl-3,5-di-t-butyl-4-hydroxybenzylphosphonate,
S,S-di-n-octadecyl-3,5-di-t-butyl-4-hydroxybenzyldithiophosphonate,
O-n-octadecyl-(3,5-di-t-butyl-4-hydroxybenzyl)-benzenephosphinate,
then similar results are obtained.

Example 3

In the same manner as in Example 1, stable polyproylene compositions are prepared with 0.1% by weight of N,N-bis(carboxymethyl)-glycine and 0.5% by weight of each one of the following compounds, taken singly:
n-octadecyl-β-(3,5-di-t-butyl-4-hydroxyphenyl)-propionate and dilauryl-thio-dipropionate.

Example 4

In the same manner as in Example 1, stable compositions of polypropylene are prepared with 0.1% by weight of 6-(4-hydroxy-3,5-di-t-butylanilino) - 2,4-bis-(n-octylthio)-1,3,5-triazine and 0.1% by weight of sodium-N,N-di(2-hydroxyethyl)-glycine etc.

What is claimed is:
1. A composition comprising a member selected from the group consisting of polypropylene and polyethylene, from about 0.01% to about 0.5% of N,N-bis(carboxymethyl)glycine and from about 0.1% to about 0.5% of at least one member selected from the group consisting of 6-(4-hydroxy-3,5-di-t-butylanilino) - 2,4-bis-(n-octylthio)-1,3,5-triazine; 2-(n-octylthio)-4,6-bis - (4-hydroxy-3,5-di-t-butylphenoxy)-1,3,5 - triazine; di-(n-octadecyl) - 4 - hydroxy-3,5-di-t-butylbenzylphosphonate; and n-octadecyl-β-(4-hydroxy - 3,5 - di-t-butylphenyl)propionate, all percentages based on weight of total composition.

2. A composition comprising polypropylene, from about 0.01% to about 0.5% of N,N-bis(carboxymethyl) glycine and from about 0.1% to about 0.5% of 6-(4-hydroxy-3,5-di-t-butylanilino)-2,4-bis - (n-octylthio) - 1,3,5-triazine, all percentages based on weight of total composition.

3. A composition comprising polypropylene, from about 0.01% to about 0.5% of N,N-bis(carboxymethyl) glycine and from about 0.1% to about 0.5% of 2-(n-octylthio) - 4,6 - bis - (4-hydroxy-3,5-di-t-butylphenoxy)-1,3,5-triazine, all percentages based on weight of total composition.

4. A composition comprising polypropylene, from about 0.01% to about 0.5% of N,N-bis(carboxymethyl) glycine and from about 0.1% to about 0.5% of di-(n-octadecyl) - 4-hydroxy-3,4-di-t - butylbenzylphosphonate, all percentages based on weight of total composition.

5. A composition comprising polypropylene, from about 0.01% to about 0.5% of N,N-bis(carboxymethyl) glycine and from about 0.1% to about 0.5% of n-octadecyl-β-(4-hydroxy - 3,5-di-t-butylphenyl)proprionate, all percentages based on weight of total composition.

References Cited

UNITED STATES PATENTS

| | | | |
|---|---|---|---|
| 2,428,353 | 10/1947 | Berworth | 260—534 |
| 2,667,522 | 1/1954 | McElroy | 260—45.85 |
| 2,985,617 | 5/1961 | Salyer et al. | 260—45.85 |
| 3,017,422 | 5/1962 | Thompson | 260—45.95 |
| 3,102,107 | 8/1963 | Soeder | 260—45.85 |

DONALD E. CZAJA, *Primary Examiner.*

LEON J. BERCOVITZ, *Examiner.*

H. E. TAYLOR, *Assistant Examiner.*